US012302173B2

(12) United States Patent
Guchhait et al.

(10) Patent No.: US 12,302,173 B2
(45) Date of Patent: May 13, 2025

(54) AI/ML BASED SS BURST SET AND CSI-RS TRS CONFIGURATION OPTIMIZATION AND IMPROVING NR NETWORK POWER AND SPECTRAL EFFICIENCY

(71) Applicant: Mavenir Systems, Inc., Richardson, TX (US)

(72) Inventors: Atanu Guchhait, Bangalore (IN); Tuhin Subhra Chakraborty, Bangalore (IN); Shubhajeet Chatterjee, Richardson, TX (US); Vishal Goyal, Kota (IN); Young-Han Nam, Plano, TX (US)

(73) Assignee: Mavenir Systems, Inc., Richardson, TX (US)

( * ) Notice: Subject to any disclaimer, the term of this patent is extended or adjusted under 35 U.S.C. 154(b) by 350 days.

(21) Appl. No.: 17/882,207

(22) Filed: Aug. 5, 2022

(65) Prior Publication Data

US 2023/0068248 A1 Mar. 2, 2023

(30) Foreign Application Priority Data

Aug. 12, 2021 (IN) .............................. 202121036437

(51) Int. Cl.
*H04W 28/00* (2009.01)
*H04L 41/5009* (2022.01)
(Continued)

(52) U.S. Cl.
CPC ..... *H04W 28/0967* (2020.05); *H04L 41/5009* (2013.01); *H04L 43/16* (2013.01); *H04W 28/0236* (2013.01); *H04W 28/24* (2013.01)

(58) Field of Classification Search
None
See application file for complete search history.

(56) References Cited

U.S. PATENT DOCUMENTS 10,966,164 B2 * 3/2021 Cho ..................... H04W 52/325
2019/0306892 A1 10/2019 Xiong et al.
(Continued)

FOREIGN PATENT DOCUMENTS

WO       2020231189 A1     11/2020
WO    WO-2020235716 A1 *  11/2020  ............. G06F 21/32

OTHER PUBLICATIONS

Extended European Search Report for corresponding European Patent Application No. 22189417.3, 12 pages, dated Dec. 8, 2022.
(Continued)

*Primary Examiner* — Gerald A Smarth
(74) *Attorney, Agent, or Firm* — Ruggiero McAllister & McMahon LLC

(57) ABSTRACT

A system for optimizing one of a 5G New Radio (NR) network or a 4G Long Term Evolution (LTE) network operation, includes: an artificial intelligence (AI) engine configured to: a) implement at least one of the following: i) collection of raw training data set; ii) training of an AI agent; iii) inference generation triggered by UE; iv) using at least one of network key performance indicator (KPI) report and network operator inputs; and v) network KPI collection after application of inferences; and
b) at least one of infer and apply at least one of i) network-wide optimal per-gNB or per transmission/reception point (TRP) Synchronization Signal (SS) burst set, and ii) associated channel state information reference signal (CSI-RS) configurations for downlink (DL) reference signal transmissions, thereby enhancing at least one of network transmission power efficiency and spectral efficiency.

4 Claims, 3 Drawing Sheets

(51) Int. Cl.
 *H04L 43/16* (2022.01)
 *H04W 28/02* (2009.01)
 *H04W 28/08* (2023.01)
 *H04W 28/24* (2009.01)

(56) References Cited

U.S. PATENT DOCUMENTS

2019/0349960 A1* 11/2019 Li .................. H04L 5/0055
2022/0095376 A1* 3/2022 Yoon .................. H04W 16/14
2022/0256382 A1 8/2022 Kang

OTHER PUBLICATIONS

M. Giordani et al "A Tutorial on Beam Management for 3GPP NR at mmWave Frequencies," in IEEE Communications Surveys & Tutorials, vol. 21, No. 1, pp. 173-196, First quarter 2019, doi: 10.1109/COMST.2018.2869411.

Y. Li et al. "Design and Analysis of Initial Access in Millimeter Wave Cellular Networks," in IEEE Transactions on Wireless Communications, vol. 16, No. 10, pp. 6409-6425, Oct. 2017, doi: 10.1109/TWC.2017.2723468.

H. Yan et al., "Compressive sensing based initial beamforming training for massive MIMO millimeter-wave systems," 2016 IEEE Global Conference on Signal and Information Processing (GlobalSIP), 2016, pp. 620-624, doi: 10.1109/GlobalSIP.2016.7905916.

R. Shafin et al., "Self-Tuning Sectorization: Deep Reinforcement Learning Meets Broadcast Beam Optimization," in IEEE Transactions on Wireless Communications, vol. 19, No. 6, pp. 4038-4053, Jun. 2020, doi: 10.1109/TWC.2020.2979446.

Erik Dahlman et al., "5G NR: The Next Generation Wireless Access Technology", Academic Press, Inc. Aug. 2018.

3rd Generation Partnership Project (3GPP) TS 38.211 V 15.0.0 "Technical Specification Group Radio Access Network; NR; Physical Channels and Modulation (Release 15)" (Release 17) Dec. 2017; 3rd Generation Partnership Project, Valbonne, France.

3rd Generation Partnership Project (3GPP) TS 38.211 V 16.0.0 "Technical Specification Group Radio Access Network; NR; Physical Channels and Modulation (Release 16)" Dec. 2019; 3rd Generation Partnership Project, Valbonne, France.

* cited by examiner

AI/ML BASED SS BURST SET AND CSI-RS TRS CONFIGURATION OPTIMIZATION AND IMPROVING NR NETWORK POWER AND SPECTRAL EFFICIENCY

BACKGROUND OF THE DISCLOSURE

1. Field of the Disclosure

The present disclosure relates to systems and methods for 5G New Radio (NR), and relates more particularly to optimizing initial access (IA) reference signal transmission.

2. Description of the Related Art

In NR wireless cellular networks, initial access (IA) and time frequency tracking (TA) depends on down-link (DL) synchronization blocks (SS Blocks) and downlink channel state information reference signal (CSI-RS) Tracking Reference Signal (TRS) transmission and measurements. Specifically, IA is based on the Synchronization Signal (SS) Blocks measurements at UE over time and frequency raster in downlink (DL), and followed by Physical random-access channel (PRACH) transmission and detection by the gNB in the implicit beam direction in uplink (UL).

Pursuant to 3GPP NR standard (e.g., Release 15 and Release 16), one SS block is a group of 4 orthogonal frequency-division multiplexing (OFDM) symbols in time and 240 subcarriers in frequency. One SS block includes Primary Synchronization Signal (PSS), Secondary Synchronization Signal (SSS) and the Physical Broadcast Channel (PBCH). Demodulation Reference Signal (DMRS), which is associated with the PBCH, can be used to estimate the Reference Signal Received Power (RSRP) of the SS block for SS block detection. In a slot of 14 symbols, there are two possible locations for SS blocks: symbols 2-5 and symbols 8-11.

Let's consider a large distribution of 5G NR base-stations (gNBs) or transmission/reception points (TRPs) in an example network scenario. Assuming 2D Poisson Point Process (PPP) for the distribution of gNBs in the example network topology, the gNB distribution can be represented as $\Phi \triangleq (x_i)$ with density $\lambda$. In the present disclosure, the terms "gNB" and "TRP" are used interchangeably for defining the optimization framework (problem) without impacting the generality of the problem scope. However, it should be noted that, as per the 3GPP definitions, gNB capability could be different from TRP capability. Similar to PPP distribution for gNB, UEs are also assumed to be 2D Poisson Point Process-distributed, and the UE of interest is at the coordinate center. Both the gNB and the target UE have to cover $$N_{\theta,gNB/UE} = \frac{\Delta_\theta}{\theta_{3dB}}$$

$$N_{\phi,gNB/UE} = \frac{\Delta_\phi}{\phi_{3dB}}$$

directions for exhaustive beam search, assuming that both the gNB and the UE have the same 3 dB beam widths, the same azimuth $\Delta_\theta$ and elevation $\Delta_\phi$ angles to cover during the search process. Assuming $K_{BF,gNB}$ and $K_{BF,UE}$ represent the number of beams that the transceiver can handle simultaneously, to cover the full $\Delta_\theta$ and $\Delta_\phi$ angular space required number of SS blocks can be expressed as the following:

$$S_D = \left\lceil \frac{N_{\theta,gNB} N_{\phi,gNB}}{K_{BF,gNB}} \right\rceil \left\lceil \frac{N_{\theta,UE} N_{\phi,UE}}{K_{BF,UE}} \right\rceil \quad (1.0)$$

IA consists of Synchronization Signal (SS) block detection, associated Physical Broadcast Channel (PBCH) demodulation at UE, followed by UL Physical Random Access Channel (PRACH) transmission in the respective beam direction, PRACH correlation power thresholding and detection at gNB. In the present example, it is assumed the UE follows implicit beam indication method suggested by 3GPP. Initial access (IA) time can be represented as the following:

$$T_{IA} = \left( \left\lceil \frac{S_D}{N_{SS}} \right\rceil - 1 \right) T_{SS} + T_{last} + T_{PRACH} \quad (2.0)$$

In the above expression (2.0), $N_{SS}$ is number of SS blocks in an SS Burst Set, $T_{SS}$ is the SS burst set time, and $T_{last}$ is the time to transmit the SS blocks in the last (or only, when only one SS burst set is sufficient) SS Burst Set. $T_{PRACH}$ is the time taken after UE detects the best beam to transmit PRACH in the UL. For simplicity of analysis, it is assumed that PRACH detection is always successful, and the impact of PRACH collision and misdetection on $T_{IA}$ is ignored. In the above expression (2.0), note that $S_D$ represents the maximum number of SS blocks needed for one TRP deployed in a target scenario and hence will require proportional number of downlink (DL) CSI-RS TRS resource transmissions and uplink (UL) PRACH time-frequency resource allocations for the UEs detecting specific SS blocks over the SS beams, e.g., as illustrated in FIG. 1. As show in FIG. 1, default periodicity 102 of the SS Burst set 101 is 20 ms in time, but can vary, e.g., from 5 ms to 160 ms. In addition, the number of SS blocks in a burst can vary, e.g., from 4 to 64. Depending on the carrier, bandwidth (BW) frequency locations or number of parallel transmissions can vary. CSI-RS TRS is dependent on the SS burst set configuration adopted.

The above-mentioned DL and UL reference signal allocations (i.e., time and frequency resources allocations) directly impact the overall network level gNB/TRP transmit power consumption and spectral efficiency degradation, minimization of which factors is highly sought after. Therefore, there is a need for an improved method and a system for optimizing the time and frequency resources allocations.

SUMMARY OF THE DISCLOSURE

According to an example embodiment of the present disclosure, an AI/ML-based optimization framework is defined for maximizing network Initial access latency $T_{IA}$ (capped to maximum tolerable value suggested by the network operator ($T_{IA\_max}$)) by minimizing the 3GPP-defined SS Burst Set configuration parameters, e.g., Number of SS Blocks per SS Burst Set, SS Burst Set periodicity, SS Block frequency grid, etc. The optimization framework can be easily extended to related CSI-RS TRS configuration as well. Through optimal selection of SS Burst Set Configuration (including CSI-RS TRS as well), the network can be optimized for IA reference signal transmission (leaner system design) and hence achieve optimal number of SS Block (as well as less CSI-RS TRS) transmissions over the air. This will result in gNB/TRP transmit power and spectral efficiency improvement for a large-scale NR network deployment scenario.

According to an example embodiment of the present disclosure, AI/ML algorithms can run in the core network elements or O-RAN defined elements such as SMO and Non-RT or Near-RT RIC. AI/ML engine will use the network-observed or measured KPI ($T_{IA}$) and other available measurement parameters to optimize the SS Burst Set (associated CSI-RS TRS).

According to an example embodiment of the present disclosure, an optimization method is provided to save time and frequency resources while maximizing the target key performance indicator (KPI), e.g., initial access time, limited to $T_{IA\_max}$. According to an example embodiment of the present disclosure, instead of deploying the networks with theoretically obtained parameter settings, the disclosed method uses network-wide optimizations of the parameters based on AI/ML algorithms to drive ($\{S_D, N_{SS}\}_{k=1,2,\ldots \#sector})g_{NB_i}$ for each $gNB_i$ configurations by exploiting UE mobility, use case, time of the day for the configuration parameters.

According to an example embodiment of the present disclosure, in a large-scale 5G NR or 4G network deployment, a method of operating an AI/ML engine is provided, which can include: performing at least one of: i) training data collection; ii) AI/ML algorithm/agent training; iii) inference generation triggered by UE; iv) using network KPI reports or operator inputs; v) KPI collection after application of inferences; and at least one of inferring and applying network-wide optimal per gNB/TRP SS Burst Set and associated CSI-RS configurations for downlink(DL) reference signal transmissions, thereby enhancing at least one of network transmission power efficiency and spectral efficiency.

According to an example embodiment of the present disclosure, a system for training data set generation based on collected raw training data set is provided, which system can include: a designated core network entity including at least one of SMO, Non-Real Time RIC, and Near Real Time RIC configured for pre-processing the training data set over one of 3GPP or O-RAN defined interface; wherein the access node including at least one of TRP, gNB, DU, and CU is the source of the raw training data.

According to an example embodiment of the present disclosure, a method of generating training data set for the AI/ML agent or engine includes: obtaining raw training data set including at least one of: PRACH receive beam index, number of PRACH instances crossing an energy threshold for the beam index, number of connected UEs in the TRP/gNB over time window of observations, UE reported RSRP; and processing the obtained raw training data set by applying AI and/or ML techniques, e.g., Deep Neural Network techniques, to define implicit relationship of the collected raw data with at least one of (1) UE mobility, (2) deployment dependent angular spread, (3) observed interferences, (4) time dependent network load and usage pattern, (5) geographical location dependent network usage, and (6) RSRP.

According to an example embodiment of the present disclosure, a method of training the AI/ML agent or engine is provided, which consists of: using pre-processed training data set to derive optimal interferences on RS configurations, e.g., optimal SS Burst set configuration, CSI-RS configuration, joint SS Burst Set and CSI-RS configuration, for each TRP/gNB in the network based on minimizing {SS beam span, Number of SS Blocks in SS Burst Set, Number of CSI-RS followed} dependent cost functions (with reward for RL case).

DETAILED DESCRIPTION

Figure 1:
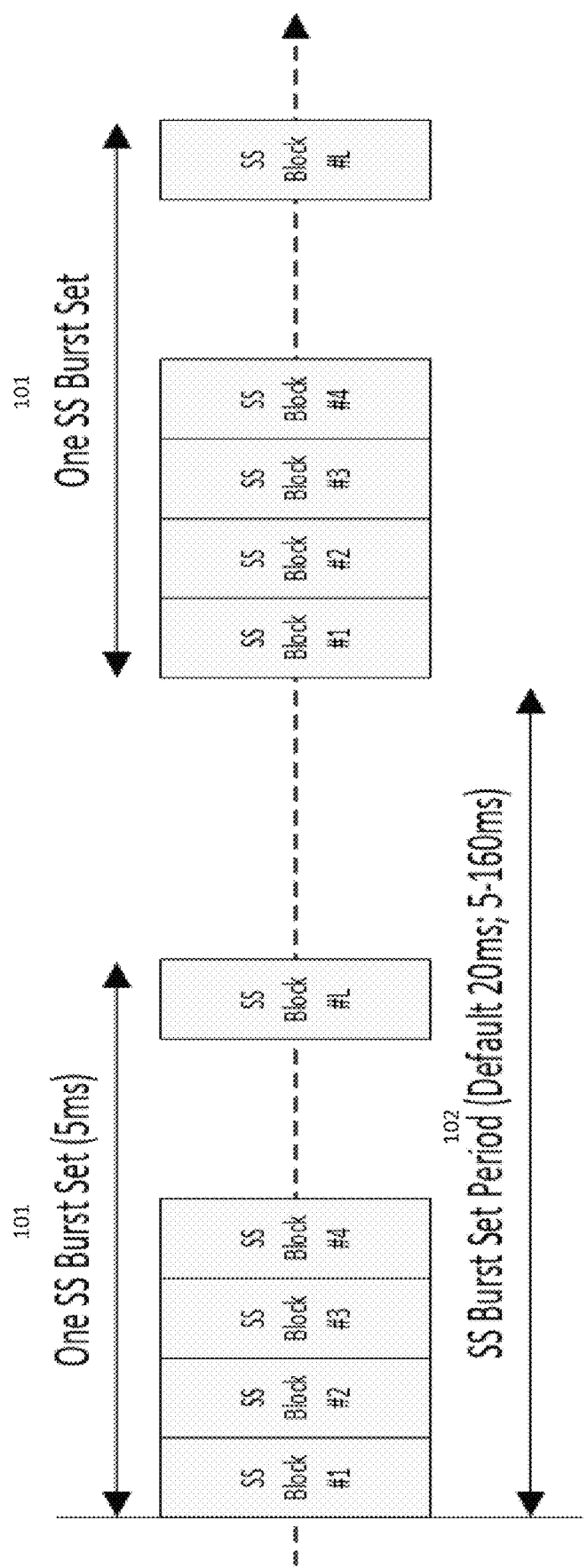
FIG. 1 illustrates the details of an example embodiment of the SS Burst set.

According to an example embodiment of the present disclosure, an optimization method is provided to save time and frequency resources while maximizing the target key performance indicator (KPI), e.g., initial access time, limited to $T_{I\_max}$. According to an example embodiment of the present disclosure, instead of deploying the networks with theoretically obtained parameter settings, the disclosed method uses network-wide optimizations of the parameters based on AI/ML algorithms to drive ($\{S_D, N_{SS}\}_{k=1,2,\ldots \#sector})g_{NB_i}$ for each $gNB_i$ configurations by exploiting UE mobility, use case, time of the day for the configuration parameters. In the context of this proposed optimization framework, the following relationships are defined by the AI/ML agent.

$$S_{D_k} := f(\text{deployment dependent angular spread; Interference;})$$

$$N_{SS_k} := [(UE \text{ Mobility Statistics; Number of Connected Users;}) \quad (3.0)$$

In the above expressions (collectively referenced as (3.0)), f(x) is a linear function of variable x (see, e.g., Equations (1.0) and (2.0) above). Thus, the goal of the AI/ML agent is to identify functional relationships for $S_D$ and $N_{SS}$ with deployment-dependent parameters using the observations available at gNB with an optimization target for initial access time KPI. The more independent observations are fed to the AI/ML agent, the better the result of functional relationship establishment. An example list of observations available at gNB (which list is not intended to be limiting for the example method according to the present disclosure) is provided below:

a) Receive beam number (beam index) for PRACH and the statistics for the detected PRACH transmissions sets;

b) Cell-specific and beam-specific RSRP of the received PRACH signals at gNB and statistics of SNR threshold T, measurement of PRACH correction power;

c) Number of received PRACH signals for a receive beam ID at sample time instant;

d) UE mobility or geolocation information (direct feedback or Xapp based);

e) Number of detected PRACH transmission in every UL Receive Beams at gNB;

f) Other relevant performance measurements, e.g., those which deal with PHY-layer beam measurements (such as those mentioned in 3GPP TS 28.552); and g) RSRP reported by the UEs for any other DL reference signal transmissions.

The following portions of the present disclosure are directed to the optimization framework (problem) to be solved by the AI/ML agent to derive optimal values for each TRP. This optimization framework (problem) can be extended further to optimize CSI-RS resource allocation following each SS Burst Set transmission in the network. Furthermore, the AI/ML model can include PRACH collision and detection failure to achieve more realistic network optimization.

To optimize the network level transmission power and improve spectral efficiency, the optimization problem can be formally defined over a set of observation windows $\{T_w\}$ at the gNB as follows:

$$\min_{\eta_1, \eta_2 \cdots \eta_{SSBeamIdx}} \{S_D \forall \text{ SS Beams with \# of } RACH \text{ detection} \geq N_{th}\} \quad (4.0)$$

$$\text{Over all } \{T_W\} \, \& \min_{\{v_{\eta_1}, v_{\eta_2}, \cdots, v_{\eta_{SSBeamIdx}}, N_{UE_{Connected\_Tw}}\}}$$

$$\{N_{SS} \leq N_{SS_{3GPP_{max}}}\} \text{ over all } \{T_w\} \text{ such that } \max_{S_D, N_{SS}} T_{IA}$$
$$T_{IA} \leq T_{IA\_max}$$

In the above expressions (collectively referenced as (4.0)), $T_{IA,max}$ is the maximum IA latency stipulated by the network operator for satisfactory network operation without degrading the KPI of the network; $\eta_1, \ldots, \eta_j, \ldots \eta_{SSBeamIdx}$ are the SS beam index at the gNB (receive beam index for PRACH); $v_{\eta_j}$ is the inferred UE mobility indicator in the direction of beam ID $\eta_j$; $N_{UEconnected\_Tw}$ is the number of connected UEs at the observation time window $T_W$; $N_{th}$ is the minimum number of PRACH instance detected in a particular Rx beam direction at the gNB to be considered for above optimization problem.

In this section, PRACH receive power and detected PRACH instances at the gNB will be discussed. Assuming $p_{UE}$ is the transmitted power of the UE for each PRACH transmissions, then under the Poisson Point Process (PPP) distribution of the UE and the gNB, the measured SNR at the gNB from $UE_i$ can be expressed as follows:

$$SNR_i = \frac{p_{UE} G_{UE,i} |h_i|^2 PL_i S_i}{\sigma^2} \quad (5.0)$$

In the above expression, $\sigma^2$ is the normalized noise power and $S_i$ is the LOS condition indicator for the UE in consideration, h is the channel fading function, $G_{UE,i}$ is the directional gain of the main lobe of the beam, and $PL_i$ is the pathloss factor for $UE_i$ to the target gNB. The gNB successfully detects the $UE_j$ when the received SNR (or correlation power) of the received PRACH achieves a signal-to-noise ratio (SNR) threshold T and the gNB detects the PRACH signal. For simplicity of analysis, such an event can be expressed as the following without considering the PRACH collision:

$I\{\max_{x_i \in \Phi} SNR_i \geq T\} = 1$: PRACH Detection Success $I\{\max_{x_i \in \Phi} SNR_i < T\} = 0$: PRACH Detection Failure, $\quad (6.0)$ where $I\{\cdot\}$ is the indicator function. PRACH detection failure can happen either because $BS_i$ is not transmitting SS block in the UE receive beam direction, or the received signal power at the UE does not meet the detection threshold T. Based on the above indicator function output, the gNB can count the number of PRACH receptions from the UEs in the receive beam direction $\eta_j$.

According to an example embodiment of the present disclosure, the first task ("Action 1") of the AI/ML agent in the optimization process is to establish (through learning) the functional relationship between angular spans $\{\Delta_\Theta, \Delta_\varphi\}$ (hence $S_D$) and select the set of receive beam directions where detected PRACH transmissions exceed $\eta_{th}$ which is formulated as hypothesis in (4.0).

Observations at each gNB/TRP is divided over a set of observation time window $\{T_w; w \geq 1\}$ in a typical day (or any predefined time span—weekdays/weekend, etc.) of operation. In each $T_W$, the gNB can log, e.g., the following example information (but the method according to the present disclosure is not limited to these example information items):

a) Number of PRACH detections from respective receive beam directions/Is;
b) Average number of PRACH detections over all receive beam IDs of interest (based on Action 1);
c) Number of connected UEs (in RRC Connected state) served.

Rate of change and number of PRACH detections over the set of observation time window $\{T_W; w \geq 1\}$ can be used as an indirect measure of the UE mobility in the cell. The AL/M agent can learn the mobility pattern based on the above observations at the gNB.

According to an example embodiment of the present disclosure, the second task ("Action 2") of the AI/ML agent in the optimization process is to find the functional relationship among the derived UE mobility information, number of connected UEs in the gNB with $N_{SS}$, and the number of SS blocks in the SS Burst Set (upper bounded by $N_{SS_{3GPmax}}$) as per (4.0).

By implementing the above-described first and second tasks, the A/ML agent (e.g., reinforcement learning (RL) agent) learns from the gNB observations and derives optimal set of values $\{S_D, N_{SS}\}$ to maximize the value of $T_{IA}$ which is upper bounded by the operator-specified maximum value. In each step, AI/ML agent action will be rewarded for the decisions which jointly minimizes $\{S_D, N_{SS}\}$ with restriction $T_{IA} \leq T_{IA\_max}$.

Joint optimization of $(S_D, N_{SS})$ with restriction $T_{IA} \leq T_{IA\_max}$ will result in following advantages:

a) usage of minimum number of SS blocks needed to support UE angular distributions, mobility, and number of connected UEs through satisfying target KPI for initial access;
b) optimal transmissions of SS beams in spatial directions where UE activity is mainly observed and varying over large time windows; and
c) flexible configuration of $T_{SS}$ to allow optimal CSI-RS configurations for each gNBs (refer to equation (2.0) above).

These factors directly impact the network transmit power and spectral efficiency.

Figure 2:
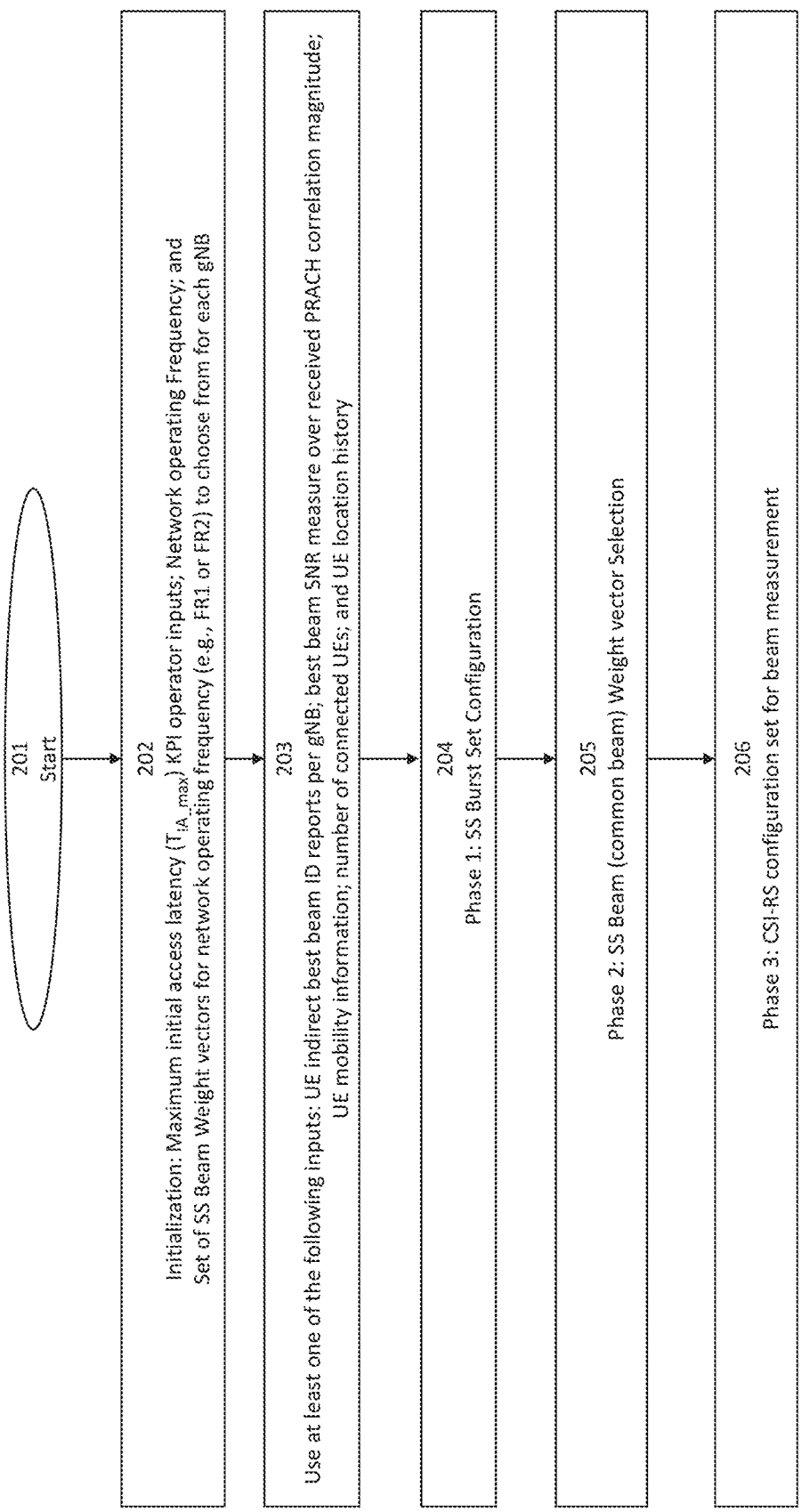
FIG. 2 is a flowchart illustrating an example methodology for training for a set of gNBs.

According to an example methodology for training for a set of gNBs (illustrated in FIG. 2, beginning with the start block 201), initialization (see, e.g., block 202 of FIG. 2) for training for a set of gNBs involves specifying the following:

a. Maximum initial access latency ($T_{IA\_max}$) KPI operator inputs;
b. Network operating Frequency (FR1 or FR2).
c. Set of SS Beam Weight vectors for network operating frequency (e.g., FR1 or FR2) to choose from for each gNB.

According to the example methodology for training for a set of gNBs, for each gNB, at least one of the following inputs can be utilized (see, e.g., FIG. 2, block 203):

1. UE indirect best beam ID reports per gNB (Rx Beam IDs over which PRACH is received);
2. best beam SNR measured over received PRACH correlation magnitude;
3. derived information at the gNB (e.g., UE mobility information, number of connected UEs); and
4. UE location History (Xapp based/R1-16 Location service based).

Based on the above-described input, a trained AI/ML agent (e.g., RL agent) for selecting the optimal SS Burst configuration is produced, which selection of the optimal SS Burst configuration can involve:
 a. Phase 1 (FIG. 2, block 204): SS Burst Set Configuration (L, SS Block frequency diversity, $T_{SS}$, CSI-RS TRS);
 b. Phase 2 (FIG. 2, block 205): SS Beam (common beam) Weight vector Selection; and
 c. Phase 3 (FIG. 2, block 206): CSI-RS configuration set for beam measurement.

Figure 3:
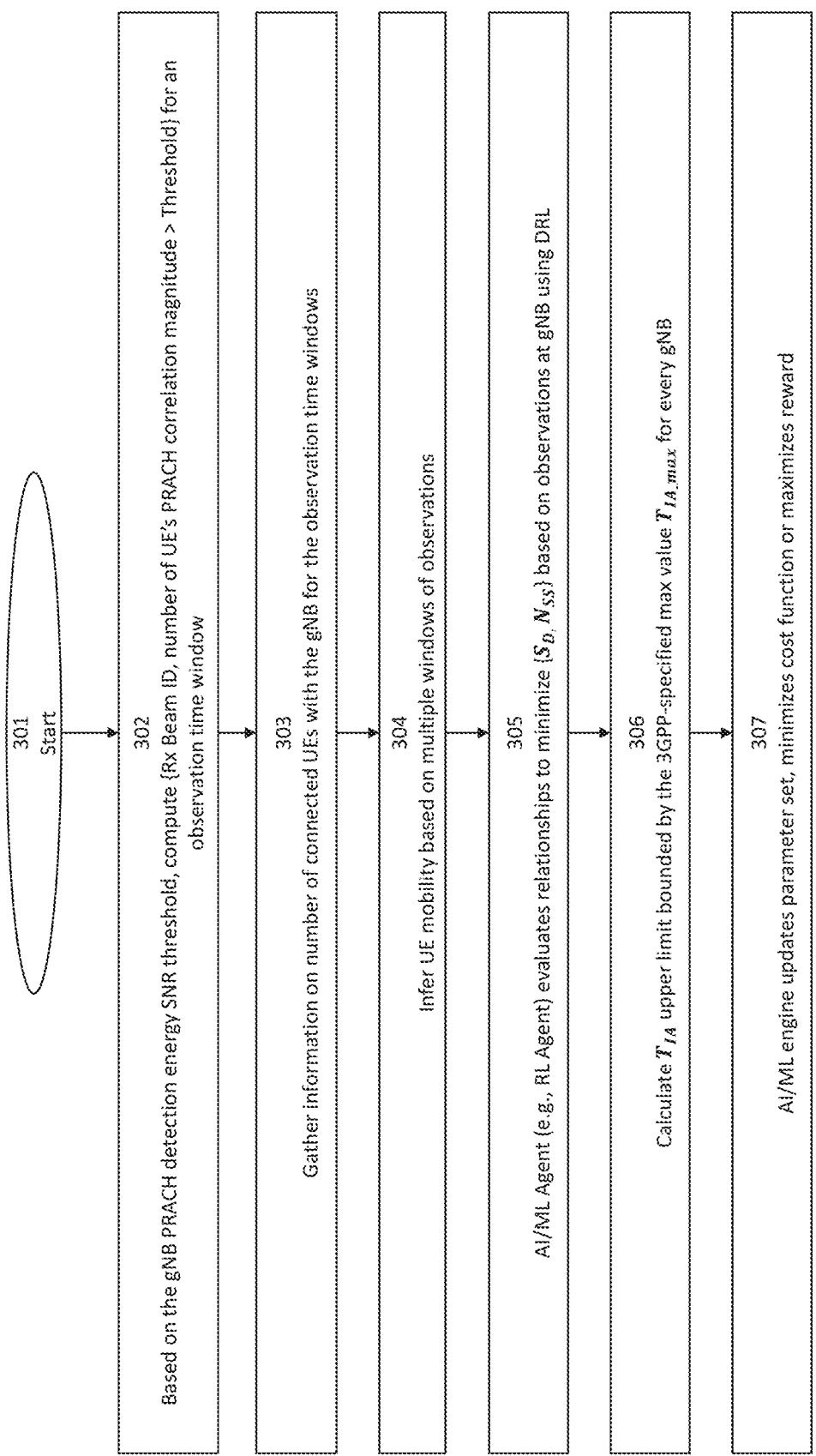
FIG. 3 is a flowchart illustrating an example process for learning the optimal SS Burst Configuration for maximizing the initial access latency.

As shown in FIG. 3, an example process for learning the optimal SS Burst Configuration for maximizing the initial access latency (JAL) up to the target IAL can involve the following (beginning with the start block 301):
 a. Based on the gNB PRACH detection energy SNR threshold, compute (Rx Beam ID, number of UE's PRACH correlation magnitude>Threshold} for an observation time window (FIG. 3, block 302);
 b. Gather information on number of connected UEs with the gNB for the observation time windows (FIG. 3, block 303);
 c. Infer UE mobility based on multiple windows of observations (FIG. 3, block 304);
 d. AI/ML Agent (e.g., RL Agent) evaluates relationships (e.g., as mentioned above in Action 1 and Action 2) to minimize $\{S_D, N_{SS}\}$ based on observations at gNB using deep reinforcement learning (DRL) (FIG. 3, block 305);
 e. Calculate $T_{IA}$ upper limit bounded by the 3GPP-specified max value $T_{IA\_max}$ for every gNB (FIG. 3, block 306); and
 f. AI/ML engine updates parameter set, minimizes cost function or maximizes reward (FIG. 3, block 307).

According to an example methodology in accordance with the present disclosure, the AI/ML agent can learn to define an optimization framework for a set of multiple gNBs using both SS and CSI-RS optimizations, e.g., based on multi-TRP/gNB observations. In this case, the training data set used for the AI/ML agent training will also incorporate the set of beamforming weight vectors to apply for different SS beam directions and shape, along with the CSI-RS configurations parameters available at the gNB. This will allow choosing the best SS beam directions in a given gNB to minimize the interference from neighboring gNBs, as well as enable optimal configurations for CSI-RS followed by SS Burst set, and hence will further optimize the network performance in terms of lowering the transmit power and improving spectral efficiency. Further variations and extensions of the above learning methodology will be readily apparent to those skilled in the art.

Definitions

3GPP: 3rd Generation Partnership Project
AGC: Automatic gain control
AI/ML: Artificial Intelligence/Machine Learning
BS: Base Station
CCH: Control channel
CPRI: Common Public Radio Interface
CUS-plane: Control, user, and synchronization plane
CSI-RS: channel state information reference signal
CSI-RS TRS: CSI-RS Tracking Reference Signal
DL: Downlink
eCPRI: Enhanced Common Public Radio Interface
eNB: eNodeB (4G LTE base station)
FEC: Forward error correction
FH: Fronthaul
FS: Functional split
FR1: Frequency Range 1
FR2: Frequency Range 2
gNB: gNodeB (5G NR base station)
GPS: Global positioning system
HW: Hardware
IA: Initial Access
IAL: Initial Access Latency
M-plane: Management plane
MIMO: Multiple Input Multiple Output
Massive MIMO: Massive Multiple Input Multiple Output
Near-RT RIC: Near Real Time RIC
Non-RT RIC: Non Real Time RIC
NR: new radio interface and radio access technology for cellular networks
KPIs: Key performance indicators
O-CU: O-RAN compliant Centralized Unit
O-DU: O-RAN compliant Distributed Unit
O-RU: O-RAN compliant Radio Unit
OPEX: Operating expenses
PRACH: Physical random-access channel
PRB: Physical resource block
PTP: Precision time protocol
PPP: Poisson point process
RRC: Radio Resource Controller
RIC: RAN Intelligent Controller
TRP: Transmission/Reception Point
RACH: Random access channel
RAT: Radio access technology
RE: Resource element
RoE: Radio over Ethernet
RSRP: Reference Signal Received Power
SMO: Service Management and Orchestration
SW: Software
SS: Synchronization Signal
SSB: Synchronization Signal Block
SyncE: Synchronous Ethernet
SNR: Signal to Noise Ratio
TCH: Traffic channel
UL: Uplink
UE: User Equipment
xAPP: applications realizing chosen telecom functions
PSS: Primary Synchronization Signal
SSS: Secondary Synchronization Signal
PBCH: Physical Broadcast Channel
DMRS: Demodulation Reference Signal
OFDM: Orthogonal Frequency Division Multiplexing
dB: Decibel

What is claimed:

1. A method of optimizing one of a 5G New Radio (NR) network or a 4G Long Term Evolution (LTE) network operation, comprising:

defining a set of observation time windows $T_W$, w≥1, at a gNB as follows:

$$\min_{\eta_1, \eta_2, \ldots \eta_{SSBeamIdx}} \{S_D \forall \text{ SS Beams with \# of RACH detection} \geq N_{th}\} \text{ Over all } \{T_W\}$$

and $$\min_{\{v_{\eta_1}, v_{\eta_2}, \ldots v_{\eta_{SSBeamIdx}}, N_{UE_{Connected\_Tw}}\}} \{N_{SS} \leq N_{SS_{3GPPmax}}\} \text{ over all } \{T_W\}$$

such that $$\max_{\substack{S_D, N_{SS} \\ T_{IA} \leq T_{IA\_max}}} T_{IA}$$

wherein:

$T_{IA\_max}$ is a maximum initial access (IA) latency stipulated by a network operator, defined as $$T_{IA} = \left(\left\lceil \frac{S_D}{N_{SS}} \right\rceil - 1\right) T_{SS} + T_{last} + T_{PRACH};$$

$N^{SS}$ is a number of synchronization signal (SS) blocks in an SS Burst Set: $T_{SS}$ is a SS burst set time: $T_{last}$ is a time to transmit the SS blocks in a last SS Burst Set: $T_{PRACH}$ is a time taken after a user equipment (UE) detects a beam to transmit Physical Random Access Channel (PRACH) in uplink (U): $S_D$ represents a maximum number of SS blocks needed for one transmission/reception point (TRP) deployed in a target scenario: $\eta_1, \ldots, \eta_j, \ldots \eta_{SSBeamIdx}$ are SS beam index at the gNB: $v_{\eta_j}$ is inferred UE mobility indicator in a direction of beam index $\eta_j$;

$N_{UE_{Connected\_Tw}}$ is a number of connected UEs at the observation time window $T_W$: $N_{th}$ is the minimum number of PRACH instance detected in a received beam direction at the gNB: $N_{SS_{3GPPmax}}$ is a upper bound for a number of SS blocks in the SS Burst Set:

establishing, by an artificial intelligence (AI) engine through a learning process, a functional relationship between angular spans $\{\Delta_\theta, \Delta_\varphi\}$, wherein $\Delta_\theta$ and $\Delta_\varphi$ are respectively azimuth and elevation angles of the beams of both the gNB and the UE, and wherein $S_D$ is a function of $\Delta_\theta$ and $\Delta_\varphi$;

selecting, by the AI engine through the learning process, a set of receive beam directions where detected PRACH transmissions exceed $N_{th}$:

indirectly measuring the UE mobility in a cell by measuring a rate of change and number of PRACH detections over the set of observation time window $T_W$, thus providing a UE mobility information:

finding, by the AI engine, a functional relationship among the UE mobility information, number of connected UEs in the gNB with $N_{SS}$, and number of SS blocks in the SS Burst Set, upper bounded $N_{SS_{3GPPmax}}$;

learning, by the AI engine, from observations available at the gNB, wherein a list of observations available at the gNB comprises at least one of:
  a) receive beam index for PRACH and the statistics for a detected PRACH transmissions set:
  b) cell-specific and beam-specific Reference Signal Received Power (RSRP) of the received PRACH signals at the gNB and statistics of SNR threshold, measurement of PRACH correction power;
  c) number of received PRACH signals for a receive beam index at sample time instant; and
  d) UE mobility or geolocation information:

deriving, by the AI engine, a set of values $\{S_D, N_{SS}\}$ to maximize the value of $T_{IA}$ with restriction $T_{IA} \leq T_{IA\_max}$: and wherein a training phase is further carried out to train the AI engine for the gNB, using at least one of the following inputs: the receive beam index $\eta_j$ over which PRACH is received: the UE mobility information; and the number of connected UEs.

2. The method according to claim 1, wherein the list of observations available at the gNB further comprises at least one of:
  e) number of detected PRACH transmission in every UL receive beams at the gNB; and
  f) RSRP reported by the UJE for any other DL reference signal transmissions.

3. The method according to claim 1, wherein the finding of the functional relationship by the AI engine is performed using deep reinforcement learning (DRL).

4. The method according to claim 1, further comprising:
  successfully detecting the U)E by the gNB when a received signal-to-noise ratio (SNR) of the received PRACH signal achieves a specified SNR threshold and the gNB detects the PRACH signal.

* * * * *